United States Patent
Ibata et al.

(10) Patent No.: US 8,179,664 B2
(45) Date of Patent: May 15, 2012

(54) SOLID ELECTROLYTIC CAPACITOR

(75) Inventors: Yasuko Ibata, Osaka (JP); Hiroya Nishimoto, Higashiosaka (JP); Takeshi Takamatsu, Daito (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 247 days.

(21) Appl. No.: 12/729,537

(22) Filed: Mar. 23, 2010

(65) Prior Publication Data

US 2010/0246098 A1    Sep. 30, 2010

(30) Foreign Application Priority Data

Mar. 30, 2009   (JP) ................. 2009-081674

(51) Int. Cl.
*H01G 9/04* (2006.01)
(52) U.S. Cl. ........ 361/528; 361/516; 361/519; 361/523; 361/525; 361/529
(58) Field of Classification Search .................. 361/528, 361/516–519, 523–525, 529–530, 540–541; 29/25.01, 25.03
See application file for complete search history.

(56) References Cited

U.S. PATENT DOCUMENTS

| 6,808,541 | B2 * | 10/2004 | Maeda | 29/25.03 |
| 6,819,546 | B2 * | 11/2004 | Kuriyama | 361/535 |
| 6,920,037 | B2 * | 7/2005 | Sano et al. | 361/540 |
| 7,126,811 | B2 * | 10/2006 | Hirano et al. | 361/523 |
| 7,835,138 | B2 * | 11/2010 | Yamashita et al. | 361/523 |
| 7,919,383 | B2 * | 4/2011 | Naito | 438/381 |

FOREIGN PATENT DOCUMENTS

JP   2002-134359 A   5/2002

* cited by examiner

*Primary Examiner* — Nguyen T Ha
(74) *Attorney, Agent, or Firm* — Westerman, Hattori, Daniels & Adrian, LLP

(57) ABSTRACT

A solid electrolytic capacitor comprises an insulating substrate in which an anode terminal and a cathode terminal are formed. A first anode section and a first cathode section are formed on a first surface of the insulating substrate, so as to be spaced from each other in a first predetermined direction. A second anode section and a second cathode section are formed on a second surface of the insulating substrate, so as to be spaced from each other in a second direction generally perpendicular to the first direction. The anode terminal comprises the first and second anode sections, which are electrically connected to each other. The cathode terminal comprises the first and second cathode sections, which are electrically connected to each other. A capacitor element is arranged on the first surface of the insulating substrate with an anode section thereof being oriented in the first direction.

8 Claims, 13 Drawing Sheets

US 8,179,664 B2

SOLID ELECTROLYTIC CAPACITOR

The application Number 2009-081674, upon which this patent application is based, is hereby incorporated by reference.

BACKGROUND OF THE INVENTION

1. Field of the Invention

The present invention relates to a solid electrolytic capacitor formed by mounting a capacitor element on an insulating substrate.

2. Description of Related Art

In a conventional solid electrolytic capacitor, as shown in FIG. 16, a capacitor element 101 is coated with an enclosure resin 102. Inside the enclosure resin 102, one end part 103a of an anode terminal 103 is connected to an anode section 101a of the capacitor element 101, while one end part 104a of a cathode terminal 104 is connected to a cathode section 101b of the capacitor element 101. Both the anode terminal 103 and the cathode terminal 104 are drawn out from the enclosure resin 102, and are bent along an outer peripheral surface of the enclosure resin 102 so that the other end parts 103b, 104b of the terminals 103, 104 are located along a lower surface 102a of the enclosure resin 102. The end parts 103b, 104b of both the terminals 103, 104 located along the lower surface 102a of the enclosure resin 102 form lower surface electrodes of the solid electrolytic capacitor.

In a manufacturing process of the solid electrolytic capacitor described above, required is a complicated step of bending the anode terminal 103 and the cathode terminal 104. In addition, since the enclosure resin 102 of appropriate thickness needs to be interposed between a lower surface of the capacitor element 101 and the lower surface electrodes, there has been a problem of lower occupancy of the capacitor element 101 in the solid electrolytic capacitor, or a problem of greater equivalent series resistance (ESR) or equivalent series inductance (ESL) due to an increase in lengths of the anode terminal 103 and the cathode terminal 104.

Therefore, as shown in FIG. 17, it has been proposed to form the solid electrolytic capacitor by mounting the capacitor element 101 on an insulating substrate 107 (e.g., a printed board) in which an anode terminal 105 and a cathode terminal 106 are formed.

In the solid electrolytic capacitor shown in FIG. 17, the anode terminal 105 comprises a first anode section 105a formed on an upper surface 107a of the insulating substrate 107 and a second anode section 105b formed on a lower surface 107b of the insulating substrate 107, which are electrically connected to each other by an anode conductive layer 105d. The anode conductive layer 105d is formed by plating an inner surface of an anode via 105c opening in the insulating substrate 107.

Also, the cathode terminal 106 comprises a first cathode section 106a formed on the upper surface 107a of the insulating substrate 107 and a second cathode section 106b formed on the lower surface 107b of the insulating substrate 107, which are electrically connected to each other by a cathode conductive layer 106d. The cathode conductive layer 106d is formed by plating an inner surface of a cathode via 106c opening in the insulating substrate 107.

Further, in the solid electrolytic capacitor shown in FIG. 17, to the first anode section 105a, electrically connected is the anode section 101a of the capacitor element 101 through a pad member 108, while, to the first cathode section 106a, electrically connected is the cathode section 101b of the capacitor element 101 by a conductive adhesive. The second anode section 105b and the second cathode section 106b form the lower surface electrodes of the solid electrolytic capacitor.

Thus, by using the insulating substrate 107 to form the solid electrolytic capacitor, a distance from the lower surface of the capacitor element 101 to the lower surface electrodes decreases. Therefore, lengths of the anode terminal 105 and the cathode terminal 106 decrease, resulting in reducing the ESR or ESL. Moreover, due to the employment of the insulating substrate 107 in which the anode terminal 105 and the cathode terminal 106 are formed, it is not necessary to execute the complicated step of bending the anode terminal and the cathode terminal required in the manufacturing process of the solid electrolytic capacitor shown in FIG. 16.

In order to further reduce the ESR or ESL in the conventional solid electrolytic capacitor shown in FIG. 17, there is an idea to mount a plurality of capacitor elements 101 on the insulating substrate 107 to thereby increase total connection area between the anode sections 101a of the capacitor elements 101 and the first anode section 105a of the anode terminal 105, as shown in FIG. 18.

However, in the conventional solid electrolytic capacitor shown in FIG. 18, the second anode section 105b and the second cathode section 106b which are to be the lower surface electrodes are arranged so as to be spaced from each other in a length direction 191 of the solid electrolytic capacitor, and the first anode section 105a and first cathode section 106a are also arranged so as to be spaced from each other in the length direction 191. Therefore, in the conventional solid electrolytic capacitor, it has been necessary that the plurality of capacitor elements 101 are aligned in a width direction 192 of the solid electrolytic capacitor, and that each of the capacitor elements 101 is connected to the first anode section 105a and the first cathode section 106a, with the anode section 101a being oriented in the length direction 191.

Because of this, in the case where the number of capacitor elements 101 to be mounted is increased in order to increase the total connection area, if the capacitor elements 101 of the same size are used, the width of the solid electrolytic capacitor increases, and the size of the solid electrolytic capacitor is changed. In the case of such a size change, a position of a land on a wiring board to which the solid electrolytic capacitor is to be connected should be changed with the size change.

On the other hand, there is an idea of designing the capacitor element 101 to be long and thin in order to increase the number of capacitor elements 101 to be mounted without changing the size of the solid electrolytic capacitor. However, with such a structure, a thickness of an anode body 101c (cf. FIG. 17) (a distance from an outer peripheral surface of the anode body 101c to the anode lead 101d) decreases, and a crack may disadvantageously be generated in the anode body 101c during sintering. Also, a position shift of the capacitor element 101 occurs easily at the time of mounting the capacitor elements 101 on the insulating substrate 107, and this makes the mounting of the capacitor elements 101 on the insulating substrate 107 difficult.

SUMMARY OF THE INVENTION

In view of above described problems, an object of the present invention is to provide a solid electrolytic capacitor which is easily-manufactured, and in which the ESR or ESL is reduced without changing the size thereof.

A first solid electrolytic capacitor according to the present invention comprises: a capacitor element including an anode section, a cathode section, and a dielectric layer; and an insulating substrate in which an anode terminal and a cathode terminal are formed. The capacitor element is mounted on the insulating substrate. Here, a first anode section and a first cathode section are formed on a first surface of the insulating substrate on which the capacitor element is mounted, so as to be spaced from each other in a first predetermined direction, and a second anode section and a second cathode section are formed on a second surface of the insulating substrate which is on an opposite side to the first surface, so as to be spaced from each other in a second direction generally perpendicular to the first direction. The anode terminal comprises the first anode section and the second anode section, which are electrically connected to each other, and the cathode terminal comprises the first cathode section and the second cathode section, which are electrically connected to each other. The capacitor element is arranged on the first surface of the insulating substrate with the anode section thereof being oriented in the first direction, and the anode section and the cathode section of the capacitor element are electrically connected to the first anode section and the first cathode section, respectively.

According to the first solid electrolytic capacitor described above, in the case where a length of the capacitor in the second direction is greater than a length thereof in the first direction especially, it is possible to increase a length of the first anode section in a direction generally perpendicular to a direction in which the anode section of the mounted capacitor element is to be oriented, compared to the conventional solid electrolytic capacitor in which the first anode section and the first cathode section are arranged so as to be spaced from each other in the second direction.

Therefore, it is possible to mount on the insulating substrate a capacitor element having a greater width (a measure in a direction generally perpendicular to a direction in which the anode section of the capacitor element is to be oriented) than that of the capacitor element mounted in the conventional solid electrolytic capacitor, or a capacitor element in which a plurality of anode sections are aligned in a lateral direction (a direction generally perpendicular to a direction in which the anode section of the capacitor element is to be oriented). Further, by aligning a plurality of capacitor elements in the second direction, it is possible to mount on the insulating substrate more capacitor elements than in the conventional solid electrolytic capacitor without decreasing the width thereof.

Therefore, the total connection area between the anode section(s) of the capacitor element(s) and the first anode section of the anode terminal can be increased without changing the size of the contour of the solid electrolytic capacitor from that of the conventional solid electrolytic capacitor, resulting in reducing the ESR or ESL of the solid electrolytic capacitor.

Further, in the solid electrolytic capacitor described above, it is possible to mount the capacitor element having a small aspect ratio, and therefore, a crack is not generated easily in the anode body of the capacitor element. Therefore, the yield is improved and production cost can be reduced.

Furthermore, in the solid electrolytic capacitor described above, it is possible to mount the capacitor element having a width equivalent to or greater than that of the capacitor element mounted in the conventional solid electrolytic capacitor, and therefore, it is easy to mount the capacitor element on the insulating substrate.

A second solid electrolytic capacitor according to the present invention is the first solid electrolytic capacitor described above, wherein the first anode section and the first cathode section extend long in the second direction.

A third solid electrolytic capacitor according to the present invention is the second solid electrolytic capacitor described above, wherein a plurality of capacitor elements are mounted on the first surface of the insulating substrate, and the plurality of capacitor elements are aligned in the second direction.

A fourth solid electrolytic capacitor according to the present invention is any one of the first to third solid electrolytic capacitors described above, wherein a connection part configured to electrically connect the first anode section and the anode section of the capacitor element to each other is formed integrally with the first anode section.

According to the fourth solid electrolytic capacitor described above, since the connection part is formed integrally with the first anode section of the anode terminal, it is not necessary to execute a complicated step required in the manufacturing process of the conventional solid electrolytic capacitor in which the connection part and the first anode section are formed as separate members, namely a step of installing the connection part on the first anode section before mounting the capacitor element on the insulating substrate.

Further, in the solid electrolytic capacitor described above, the connection condition between the connection part and the first anode section is better than in the conventional solid electrolytic capacitor in which the connection part and the first anode section are formed as separate members, and the ESR or ESL of the solid electrolytic capacitor is reduced.

A fifth solid electrolytic capacitor according to the present invention is any one of the first to fourth solid electrolytic capacitors described above, wherein a distance between the first anode section and the first cathode section with respect to the first direction is smaller than a distance between the second anode section and the second cathode section with respect to the second direction.

According to the fifth solid electrolytic capacitor described above, it is possible to increase the area of the first cathode section, and therefore, it is possible to increase the connection area between the first cathode section and the cathode section of the capacitor element, resulting in reducing the ESR or ESL of the solid electrolytic capacitor.

A sixth solid electrolytic capacitor according to the present invention is any one of the first to fifth solid electrolytic capacitors described above, wherein an end of the cathode section of the capacitor element and an end of the first cathode section of the cathode terminal, which are located on the first anode section side, are generally flush with each other at a position spaced from the first anode section by a predetermined distance in the first direction.

According to the sixth solid electrolytic capacitor described above, the first anode section and the first cathode section are adjacent to each other, and therefore, a path of an electric current flowing in the solid electrolytic capacitor is short, resulting in reducing the ESL of the solid electrolytic capacitor.

A seventh solid electrolytic capacitor according to the present invention is any one of the first to sixth solid electrolytic capacitors described above, wherein the capacitor element includes an anode body from which an anode lead is drawn out, the dielectric layer is formed on an outer peripheral surface of the anode body, a cathode layer is formed on an electrolyte layer which is formed on the dielectric layer, and the anode lead and the cathode layer form the anode section and the cathode section of the capacitor element, respectively.

An eighth solid electrolytic capacitor according to the present invention is any one of the first to sixth solid electrolytic capacitors described above, wherein the capacitor element includes a foil-like anode body, the dielectric layer is formed on a part of an outer peripheral surface of the anode body, a cathode layer is formed on an electrolyte layer which is formed on the dielectric layer, and a part of the outer peripheral surface of the anode body which is exposed from the dielectric layer and the cathode layer form the anode section and the cathode section of the capacitor element, respectively.

DETAILED DESCRIPTION OF THE PREFERRED EMBODIMENT

A preferred embodiment of the present invention is described in detail below with reference to the drawings.

Figure 1:
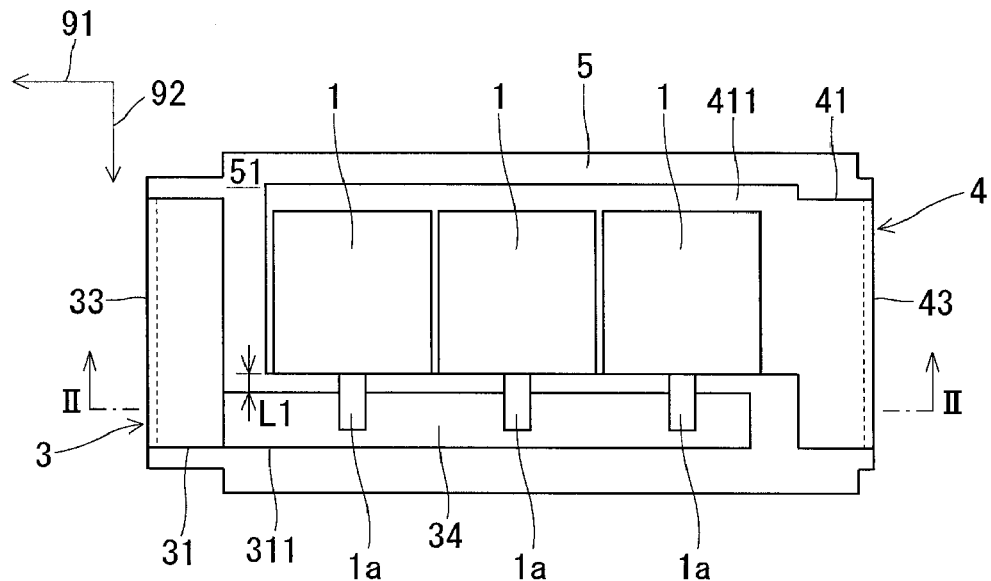
FIG. 1 is a top view of a solid electrolytic capacitor according to an embodiment of the present invention without showing an enclosure resin thereof.
Figure 2:
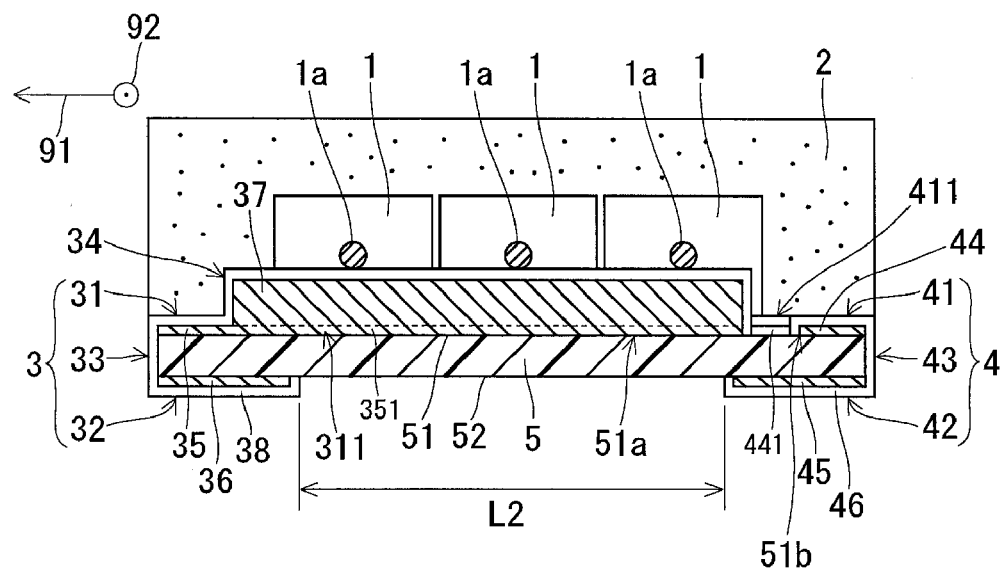
FIG. 2 is a cross-sectional view of the solid electrolytic capacitor cut along a II-II line shown in FIG. 1.

As shown in FIG. 1, a solid electrolytic capacitor according to the embodiment of the present invention includes three capacitor elements 1, and an insulating substrate 5 in which an anode terminal 3 and a cathode terminal 4 are formed. As shown in FIG. 2, the solid electrolytic capacitor is formed by mounting the three capacitor elements 1 on the insulating substrate 5, and coating the three capacitor elements 1 with an enclosure resin 2.

Here, the number of capacitor elements 1 to be mounted on the insulating substrate 5 is not limited to three, and it may be two, or three or more. Further, it may be one as to be discussed later.

Figure 3:
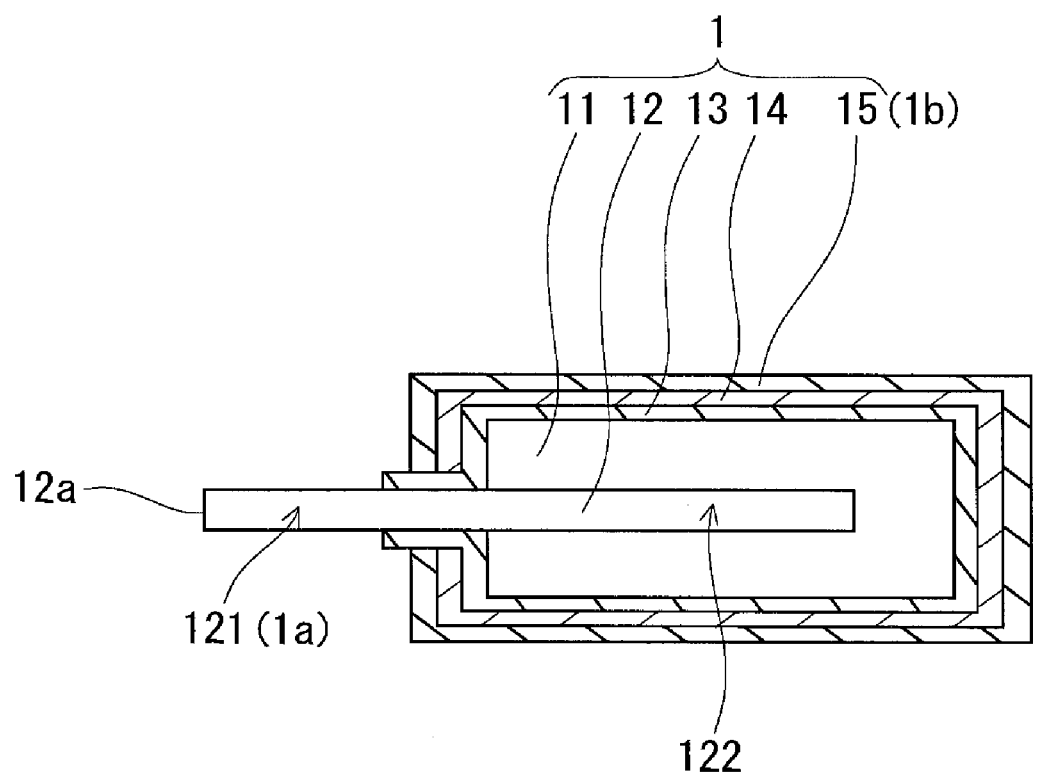
FIG. 3 is a cross-sectional view of a capacitor element included in the solid electrolytic capacitor.

As shown in FIG. 3, the capacitor element 1 comprises an anode body 11 from which an anode lead 12 is drawn out, a dielectric layer 13 formed on an outer peripheral surface of the anode body 11, an electrolyte layer 14 formed on the dielectric layer 13, and a cathode layer 15 formed on the electrolyte layer 14.

The anode body 11 is formed by a porous sintered body made of a valve metal. As the valve metal, used is, for example, tantalum, niobium, titanium, aluminum or the like.

The anode lead 12 comprises a part 121 which includes one end part 12a and projects from the outer peripheral surface of the anode body 11, and a remaining part 122 buried in the anode body 11. The anode lead 12 is formed of a valve metal of the same kind as or different kind from the valve metal forming the anode body 11, and the anode body 11 and the anode lead 12 are electrically connected to each other.

The dielectric layer 13 is formed by an oxide film formed on the outer peripheral surface of the anode body 11, and the oxide film is formed by immersing the anode body 11 in an electrolytic solution such as phosphate aqueous solution, adipic acid aqueous solution or the like to oxidize the outer peripheral surface of the anode body 11 electrochemically (anodic oxidation).

The electrolyte layer 14 is formed of an electrically-conductive inorganic material such as manganese dioxide or the like, or an electrically-conductive organic material such as TCNQ (Tetracyano-quinodimethane) complex salt, electrically-conductive polymer or the like, and formed on the dielectric layer 13.

The cathode layer 15 is formed by a carbon layer formed on the electrolyte layer 14 and a silver paste layer formed on the carbon layer, and the electrolyte layer 14 and the cathode layer 15 are electrically connected to each other.

In the capacitor element 1 described above, the part 121 of the anode lead 12 which is drawn out from the anode body 11 forms an anode section 1a of the capacitor element 1, while the cathode layer 15 forms a cathode section 1b of the capacitor element 1.

As shown in FIG. 1, a first anode section 31 and a first cathode section 41 are formed on an upper surface 51 of the insulating substrate 5 on which the capacitor element 1 is to be mounted. The first anode section 31 and the first cathode section 41 are spaced from each other. On the first anode section 31 and the first cathode section 41, formed, respectively, are an anode extension part 311 and a cathode extension part 411 which are extending long in a longitudinal direction 91 of the solid electrolytic capacitor (the direction 91 is hereinafter referred to as a length direction), and spaced from each other in a direction 92 generally perpendicular to the length direction 91 (the direction 92 is hereinafter referred to as a width direction).

As shown in FIG. 2, on a lower surface 52 of the insulating substrate 5 which is on an opposite side to the upper surface 51, further formed are a second anode section 32 and a second cathode section 42 which are spaced from each other in the length direction 91.

The anode terminal 3 comprises the first anode section 31 and the second anode section 32, which are electrically connected to each other by an anode conductive layer 33. The anode conductive layer 33 is formed on a part of a side edge surface of the insulating substrate 5. The cathode terminal 4 comprises the first cathode section 41 and the second cathode section 42, which are electrically connected to each other by a cathode conductive layer 43. The cathode conductive layer 43 is formed on a part of a side edge surface of the insulating substrate 5.

A connection part 34 is formed integrally with the anode extension part 311 of the first anode section 31 to electrically connect the first anode section 31 and the anode section 1a of the capacitor element 1 to each other. In this embodiment, the connection part 34 projects from an upper surface of the first anode section 31 at a position on the anode extension part 311.

Specifically, in the solid electrolytic capacitor according to this embodiment, a first anode forming part 35 and a first cathode forming part 44 are formed on the upper surface 51 of the insulating substrate 5. The first anode forming part 35 and the first cathode forming part 44 include, respectively, an anode extension forming part 351 and a cathode extension forming part 441 which extend long in the length direction 91 and are spaced from each other in the width direction 92. A second anode forming part 36 and a second cathode forming part 45 are formed on the lower surface 52 of the insulating substrate 5. A connection forming part 37 projects integrally on an upper surface of the anode extension forming part 351 of the first anode forming part 35.

A plating layer 38 is formed on: outer peripheral surfaces of the first anode forming part 35 and the connection forming part 37 which are formed integrally with each other; an outer peripheral surface of the second anode forming part 36; and a part of the side edge surface of the insulating substrate 5. And a plating layer 46 is formed on outer peripheral surfaces of the first and second cathode forming parts 44, 45 and a part of the side edge surface of the insulating substrate 5. Here, copper is used as a material of the first and second anode forming parts 35, 36, and the first and second cathode forming parts 44, 45.

The first anode section 31 of the anode terminal 3 is formed by the first anode forming part 35 and a part of the plating layer 38 which is formed on the outer peripheral surface of the first anode forming part 35. The second anode section 32 of the anode terminal 3 is formed by the second anode forming part 36 and a part of the plating layer 38 which is formed on the outer peripheral surface of the second anode forming part 36. And, the anode conductive layer 33 of the anode terminal 3 is formed by a part of the plating layer 38 which is formed on the side edge surface of the insulating substrate 5.

Further, the connection part 34 is formed by the connection forming part 37 and a part of the plating layer 38 which is formed on the outer peripheral surface of the connection forming part 37.

Furthermore, the first cathode section 41 of the cathode terminal 4 is formed by the first cathode forming part 44 and a part of the plating layer 46 which is formed on the outer peripheral surface of the first cathode forming part 44. The second cathode section 42 of the cathode terminal 4 is formed by the second cathode forming part 45 and a part of the plating layer 46 which is formed on the outer peripheral surface of the second cathode forming part 45. And, the cathode conductive layer 43 of the cathode terminal 4 is formed by a part of the plating layer 46 which is formed on the side edge surface of the insulating substrate 5.

The anode terminal 3 and the cathode terminal 4 are formed on the upper surface 51 and the lower surface 52 of the insulating substrate 5 so that a distance L1 is smaller than a distance L2. Here the distance L1 is a distance between the anode extension part 311 and the cathode extension part 411 for the width direction 92 shown in FIG. 1. Besides, the distance L2 is a distance between the second anode section 32 and the second cathode section 42 for the length direction 91 shown in FIG. 2.

The three capacitor elements 1 are aligned on the upper surface 51 of the insulating substrate 5 in the length direction 91 as shown in FIG. 1, and each of the capacitor elements 1 is arranged with the anode section 1a thereof being oriented in the width direction 92. The anode section 1a of the capacitor element 1 is electrically connected to an end part of the connection part 34 by welding, and the cathode section 1b (cf. FIG. 3) of the capacitor element 1 is electrically connected to the cathode extension part 411 of the first cathode part 41 by a conductive adhesive.

Further, each of the capacitor elements 1 is arranged so that an end of the cathode section 1b of the capacitor element 1 and an end of the cathode extension part 411 of the first cathode section 41, which are both located on the first anode section 31 side, are generally flush with each other at a position spaced from the first anode section 31 by the predetermined distance L1 in the width direction 92.

In this embodiment, the upper surface 51 of the insulating substrate 5 is flat as shown in FIG. 2 and does not have a step. On the upper surface 51, an anode section forming area 51a where the first anode section 31 is formed and a cathode section forming area 51b where the first cathode section 41 is formed are included in the same plane.

The enclosure resin 2 coating the capacitor element 1 is formed on the upper surface 51 of the insulating substrate 5 so that the second anode section 32 and the second cathode section 42 are exposed from the enclosure resin 2, and the anode conductive layer 33 and the cathode conductive layer 43 are exposed from the enclosure resin 2. Therefore, in the solid electrolytic capacitor according to this embodiment, the second anode section 32 and the second cathode section 42 form the lower surface electrodes, and, the anode conductive layer 33 and the cathode conductive layer 43 are exposed from side surfaces of the enclosure resin 2.

The first anode section 31, the first cathode section 41, and the connection part 34 are coated with the enclosure resin 2 together with the capacitor element 1.

A manufacturing method of the above described solid electrolytic capacitor is explained below. In this manufacturing method, executed are an electrode forming step of forming the anode terminal 3 and the cathode terminal 4 on the insulating substrate 5, an element mounting step of mounting the capacitor element 1 on the insulating substrate 5, a resin coating step of coating the capacitor element 1 with the enclosure resin 2, and a cutting step of cutting the insulating substrate 5 to complete the solid electrolytic capacitor, in this order.

The electrode forming step includes first to fourth steps. In the electrode forming step, the first to fourth steps are executed in this order.

Figure 4A:
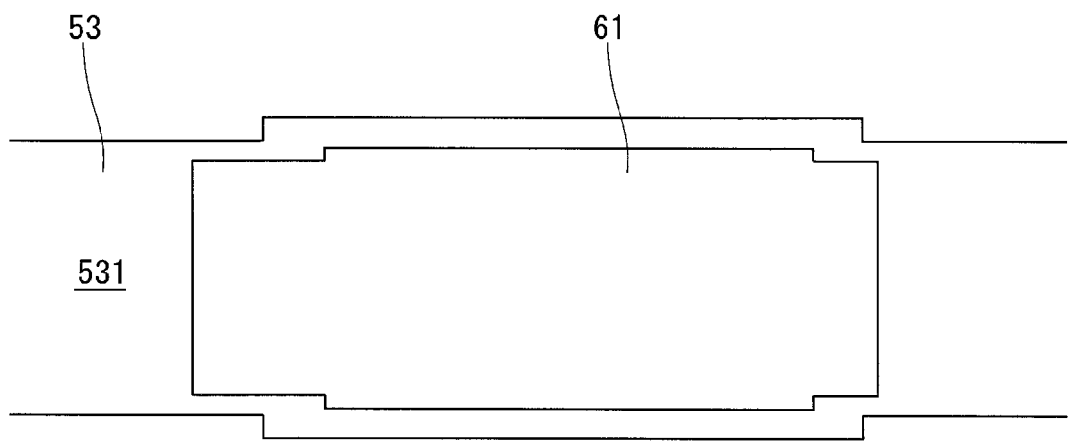
FIG. 4a is a top view for explaining a first step of an electrode forming step in a manufacturing step of the solid electrolytic capacitor.
Figure 4B:
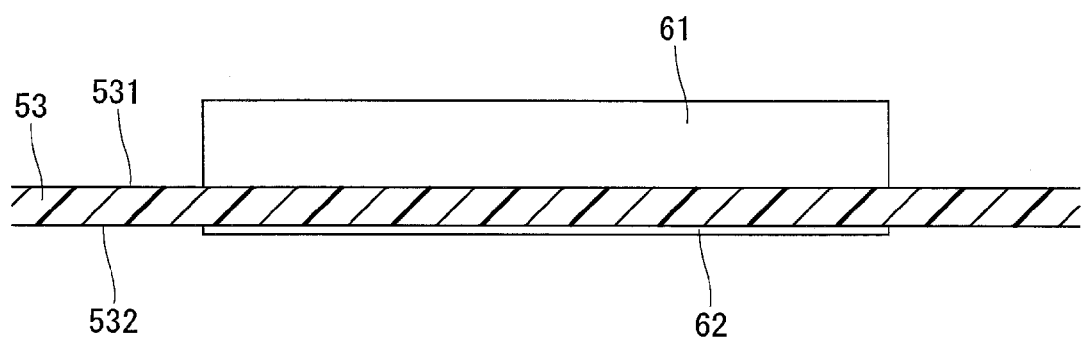
FIG. 4b is a cross-sectional view for explaining the first step.

In the first step, as shown in FIGS. 4a and 4b, one copper sheet 61 is bonded to an upper surface 531 of an insulating base 53 which is to be the insulating substrate 5 of the solid electrolytic capacitor described above and one copper sheet 62 is bonded to a lower surface 532 of the insulating base 53. As the copper sheet 61 to be bonded to the upper surface 531 of the insulating base 53, employed is a sheet having a greater thickness than the copper sheet 62 to be bonded to the lower surface 532.

Figure 5A:
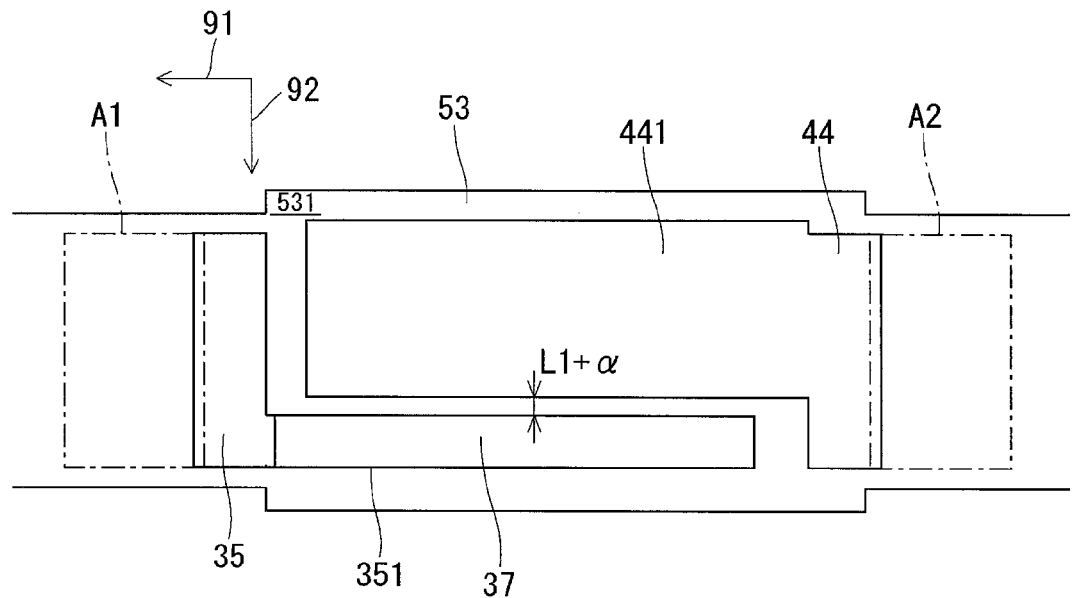
FIG. 5a is a top view for explaining a second step of the electrode forming step.
Figure 5B:
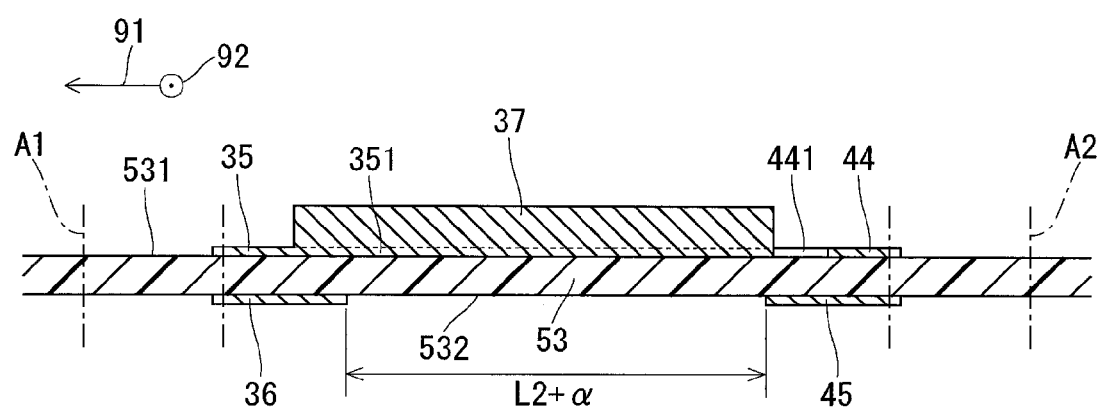
FIG. 5b is a cross-sectional view for explaining the second step.

In the second step, the copper sheet 62 bonded to the lower surface 532 of the insulating base 53 is etched to form, as shown in FIG. 5b, the second anode forming part 36 and the second cathode forming part 45 which have generally the same thicknesses at positions spaced from each other in the length direction 91 by a distance (L2+α) including the distance L2 and a distance α corresponding to thicknesses of the plating layers 38, 46 to be discussed later.

Furthermore, the copper sheet 61 bonded to the upper surface 531 of the insulating base 53 is etched to form, as shown in FIGS. 5a and 5b, the first anode forming part 35 and the first cathode forming part 44 having generally the same thicknesses at positions spaced from each other. Through this etching process, as shown in FIG. 5a, the anode extension forming part 351 and the cathode extension forming part 441 are formed in the first anode forming part 35 and the first cathode forming part 44 respectively. These extension forming parts 351, 441 extend long in the length direction 91, and are spaced from each other in the width direction 92 by a distance (L1+α). Here, the distance (L1+α) is a distance including the distance L1 and the distance α corresponding to the thicknesses of the plating layers 38, 46 to be discussed later.

By etching the copper sheet 61 described above, the connection forming part 37 is formed on an upper surface of the first anode forming part 35 at a position on the anode extension forming part 351 as shown in FIG. 5b. Thus, by forming the first anode forming part 35 and the connection forming part 37 from the one copper sheet 61, the first anode forming part 35 and the connection forming part 37 are formed integrally with each other.

Figure 6A:
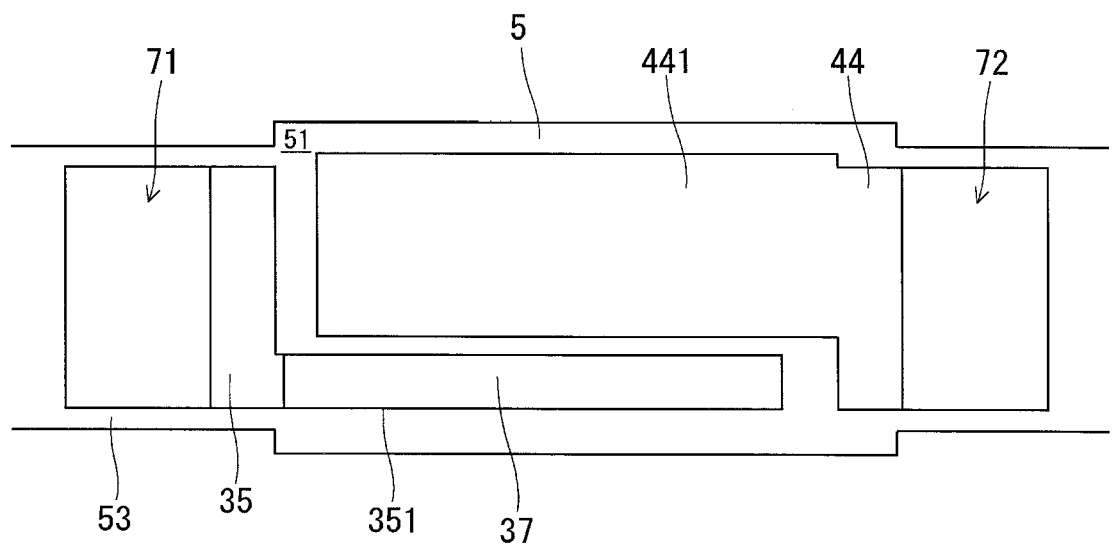
FIG. 6a is a top view for explaining a third step of the electrode forming step.
Figure 6B:
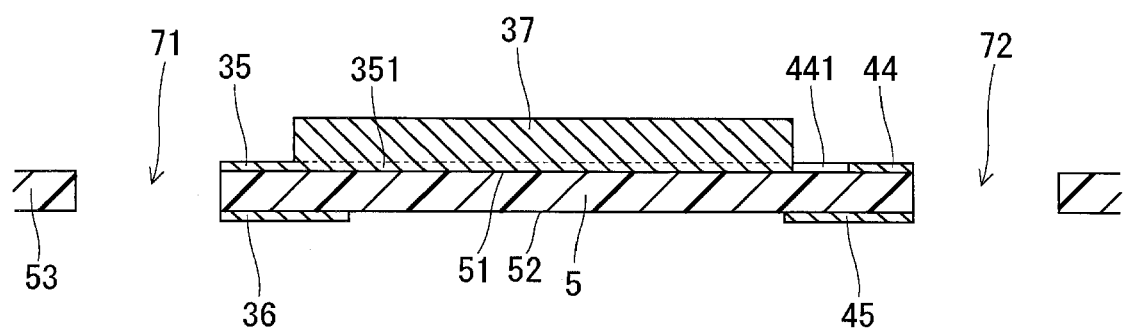
FIG. 6b is a cross-sectional view for explaining the third step.

In the third step, by punching out an area of the insulating base 53 bounded by an A1 line shown in FIG. 5a, namely an area located on the opposite side of the second anode forming part 36 to the second cathode forming part 45 as shown in FIG. 5b, formed is a through-hole 71 as shown in FIG. 6a. At this time, end parts of the first and second anode forming parts 35, 36 are punched out together with the area of the insulating base 53. Therefore, as shown in FIG. 6b, side edge surfaces of the first and second anode forming parts 35, 36 are exposed to inside of the through-hole 71.

Further, by punching out an area of the insulating base 53 bounded by an A2 Line shown in FIG. 5a, namely an area located on the opposite side of the second cathode forming part 45 to the second anode forming part 36 as shown in FIG. 5b, formed is a through-hole 72 as shown in FIG. 6a. At this time, end parts of the first and second cathode forming parts 44, 45 are punched out together with the area of the insulating base 53. Therefore, as shown in FIG. 6b, side edge surfaces of the first and second cathode forming parts 44, 45 are exposed to inside of the through-hole 72.

By forming the through-hole 71 and the through-hole 72 as described above, the insulating substrate 5 on which the capacitor element 1 is to be mounted is formed by an area of the insulating base 53 between the through-hole 71 and the through-hole 72.

Figure 7A:
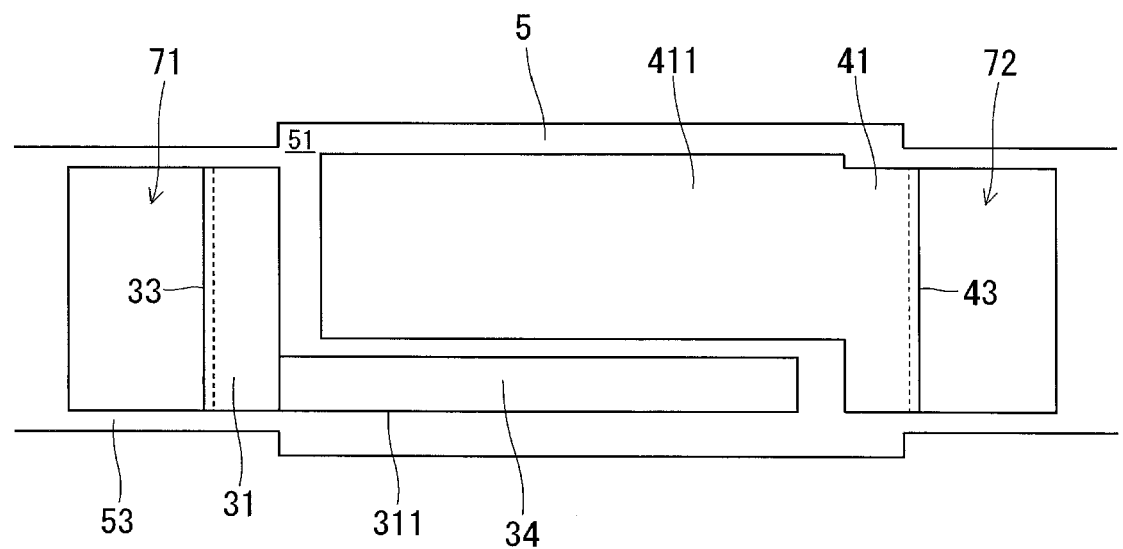
FIG. 7a is a top view for explaining a fourth step of the electrode forming step.
Figure 7B:
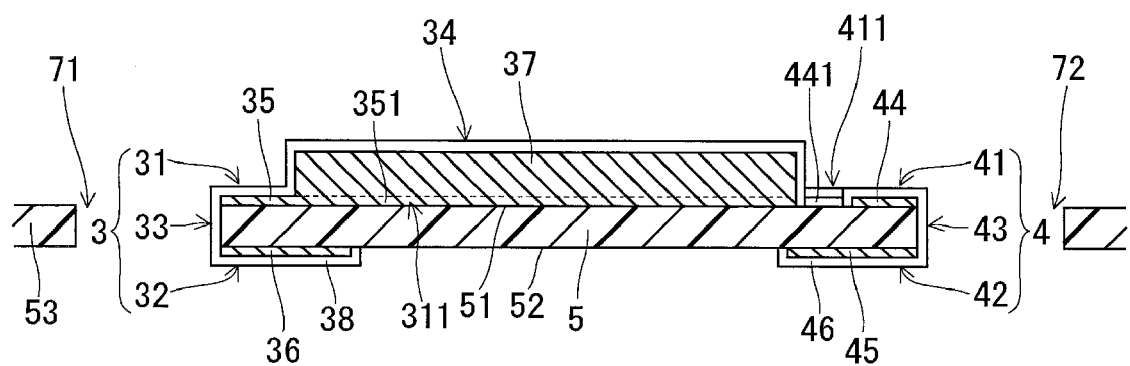
FIG. 7b is a cross-sectional view for explaining the fourth step.

In the fourth step, as shown in FIGS. 7a and 7b, plating is formed on: the outer peripheral surfaces of the first anode forming part 35 and the connection forming part 37 which are formed integrally with each other; the outer peripheral surface of the second anode forming part 36; and a part of an inner surface of the through-hole 71, to form the plating layer 38. Thus, the first anode forming part 35 and the second anode forming part 36 are electrically connected to each other by the plating layer 38, and the connection condition thereof is very good. Here, employed for the plating is a metal having high conductivity such as copper, tin or the like.

Likewise, plating is formed on the outer peripheral surfaces of the first and second cathode forming parts 44, 45 and a part of an inner surface of the through-hole 72, to form the plating layer 46. Thus, the first cathode forming part 44 and the second cathode forming part 45 are electrically connected to each other by the plating layer 46, and the connection condition thereof is very good. Here, employed for the plating is a metal having high conductivity such as copper, tin or the like.

By executing the first to fourth steps as described above, the first anode section 31 of the anode terminal 3 is formed by the first anode forming part 35 and a part of the plating layer 38 which is formed on the outer peripheral surface of the first anode forming part 35. The second anode section 32 of the anode terminal 3 is formed by the second anode forming part 36 and a part of the plating layer 38 which is formed on the outer peripheral surface of the second anode forming part 36. And the anode conductive layer 33 of the anode terminal 3 is formed by a part of the plating layer 38 which is formed on the inner surface of the through-hole 71 (namely the side edge surface of the insulating substrate 5).

Further, the connection part 34 is formed by the connection forming part 37 and a part of the plating layer 38 which is formed on the outer peripheral surface of the connection forming part 37.

Furthermore, the first cathode section 41 of the cathode terminal 4 is formed by the first cathode forming part 44 and a part of the plating layer 46 which is formed on the outer peripheral surface of the first cathode forming part 44. The second cathode section 42 of the cathode terminal 4 is formed by the second cathode forming part 45 and a part of the plating layer 46 which is formed on the outer peripheral surface of the second cathode forming part 45. And the cathode conductive layer 43 of the cathode terminal 4 is formed by a part of the plating layer 46 which is formed on the inner surface of the through-hole 72 (namely the side edge surface of the insulating substrate 5).

Thus, on the insulating substrate 5, formed are the anode terminal 3 comprising the first anode section 31 and the second anode section 32 which are electrically connected to each other by the anode conductive layer 33, and the cathode terminal 4 comprising the first cathode section 41 and the second cathode section 42 which are electrically connected to each other by the cathode conductive layer 43. The connection part 34 is formed integrally with the first anode section 31.

Figure 8A:
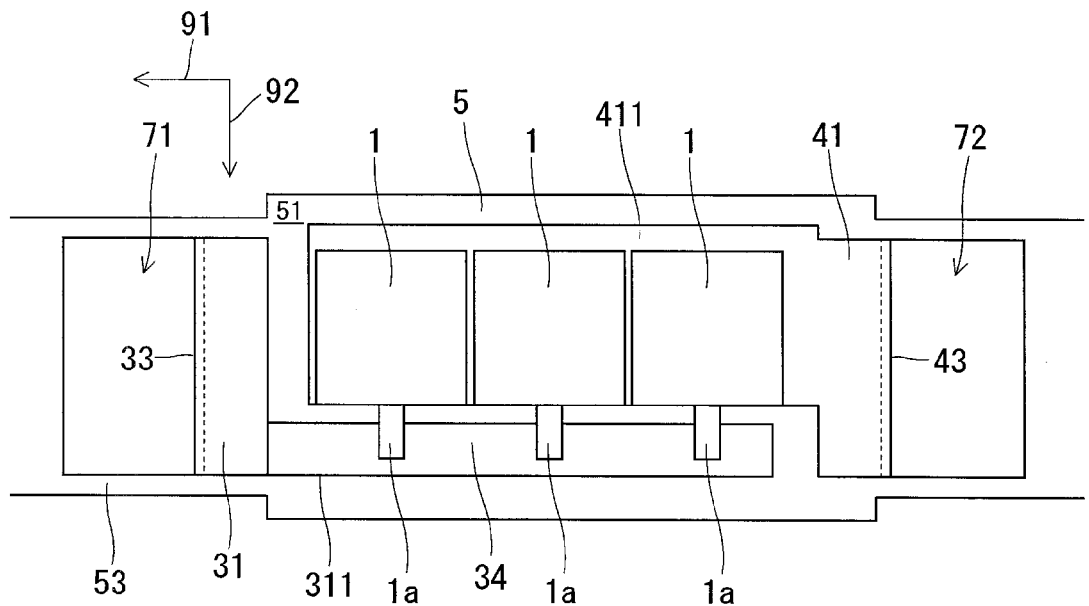
FIG. 8a is a top view for explaining an element mounting step in the manufacturing step of the solid electrolytic capacitor.
Figure 8B:
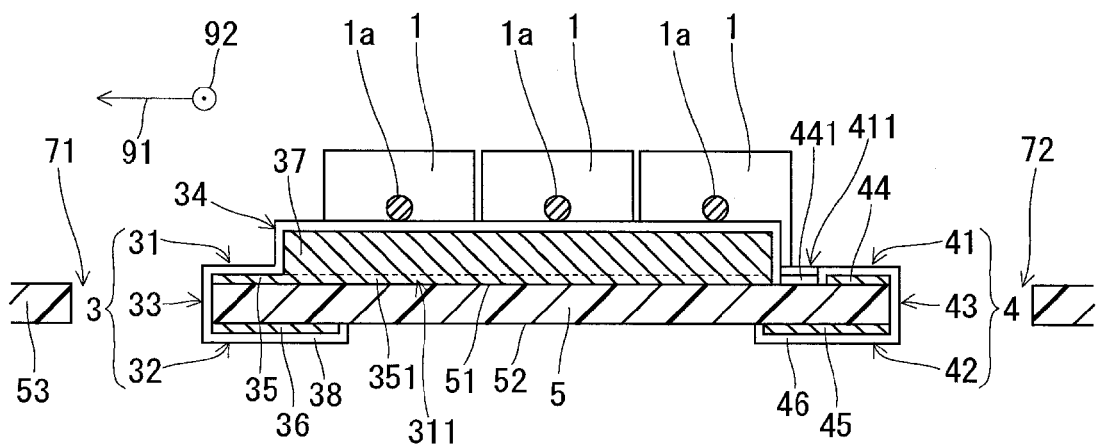
FIG. 8b is a cross-sectional view for explaining the element mounting step.

In the element mounting step, as shown in FIGS. 8a and 8b, the three capacitor elements 1 are aligned on the upper surface 51 of the insulating substrate 5 in the length direction 91. At this time, each of the capacitor elements 1 is arranged with the anode section 1a thereof being oriented in the width direction 92. The anode section 1a of the capacitor element 1 is electrically connected by welding to an end part of the connection part 34 formed integrally with the first anode section 31, and the cathode section 1b (cf. FIG. 3) of the capacitor element 1 is electrically connected to the first cathode section 41 by the conductive adhesive.

Figure 9A:
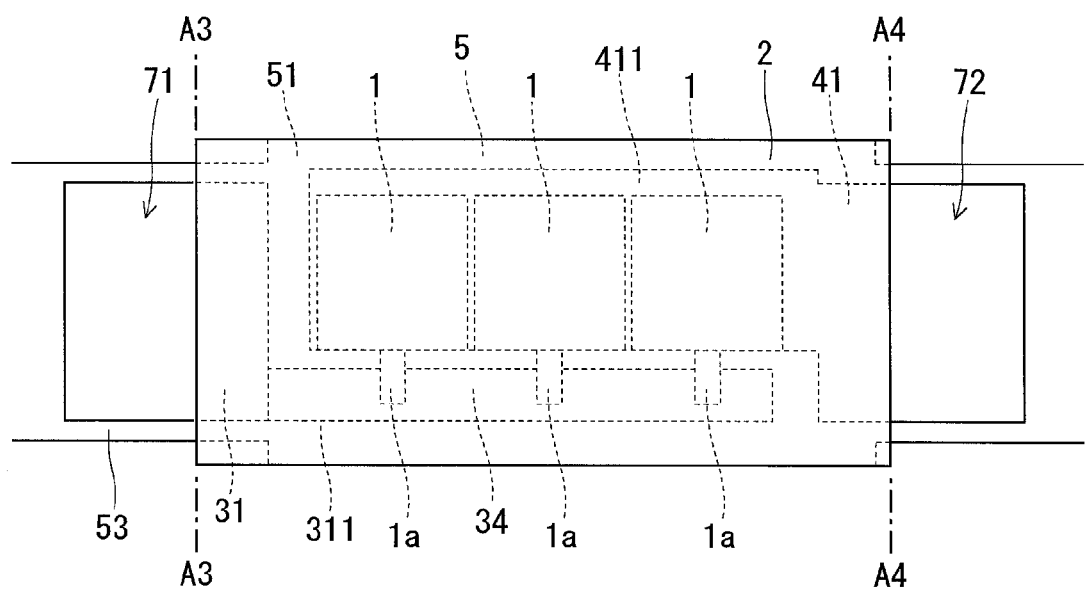
FIG. 9a is a top view for explaining a resin coating step and a cutting step in the manufacturing step of the solid electrolytic capacitor.
Figure 9B:
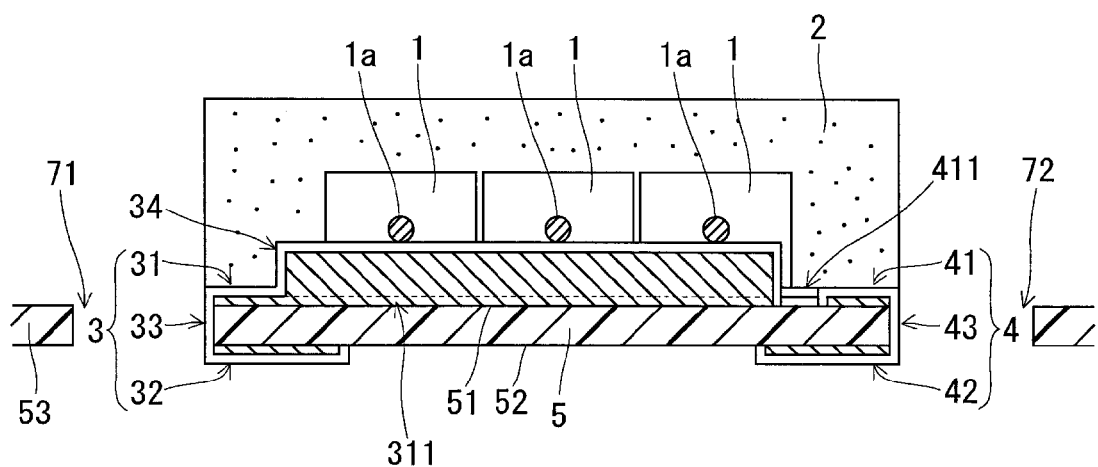
FIG. 9b is a cross-sectional view for explaining the resin coating step and the cutting step.

In the resin coating step, as shown in FIGS. 9a and 9b, the enclosure resin 2 is applied to the upper surface 51 of the insulating substrate 5 to coat the three capacitor elements 1 with the enclosure resin 2. At this time, the first anode section 31, the first cathode section 41, and the connection part 34 are coated with the enclosure resin 2 together with the capacitor elements 1.

In contrast, the lower surface 52 of the insulating substrate 5, and the anode conductive layer 33 and the cathode conductive layer 43 formed on the side edge surface of the insulating substrate 5 are not coated with the enclosure resin 2 and maintained in an exposed state.

Therefore, the second anode section 32 and the second cathode section 42 formed on the lower surface 52 of the insulating substrate 5 are arranged so as to be exposed from the enclosure resin 2, and, the second anode section 32 and the second cathode section 42 form the lower surface electrodes. And, the anode conductive layer 33 and the cathode conductive layer 43 are exposed from the side surfaces of the enclosure resin 2.

In the cutting step, the insulating base 53 is cut along an A3-A3 line and an A4-A4 line shown in FIG. 9a. The solid electrolytic capacitor shown in FIGS. 1 and 2 is thereby completed.

Figure 17:
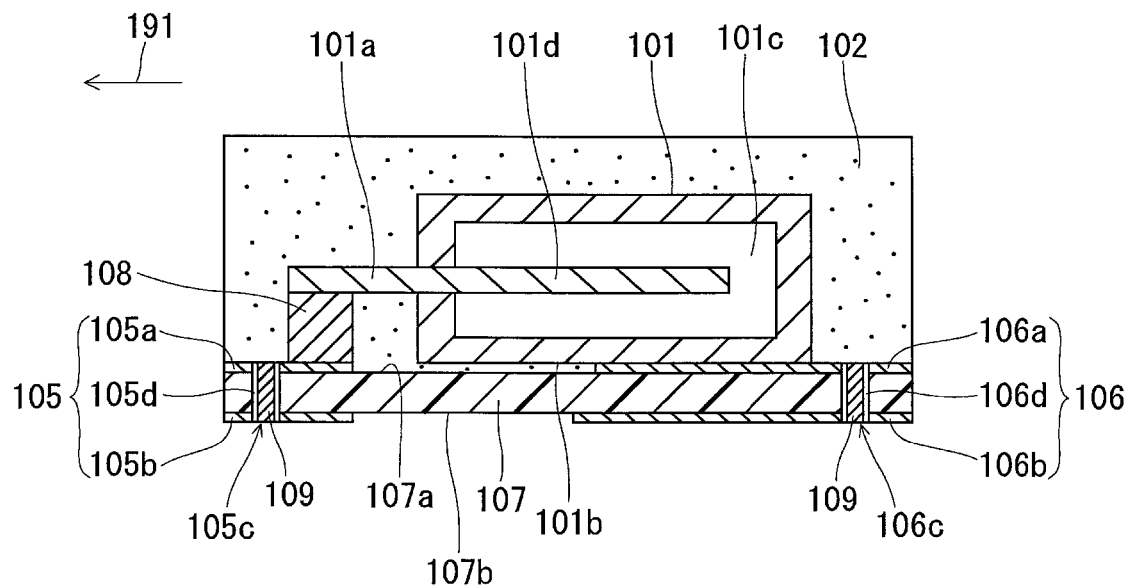
FIG. 17 is a cross-sectional view showing another conventional solid electrolytic capacitor.
Figure 18:
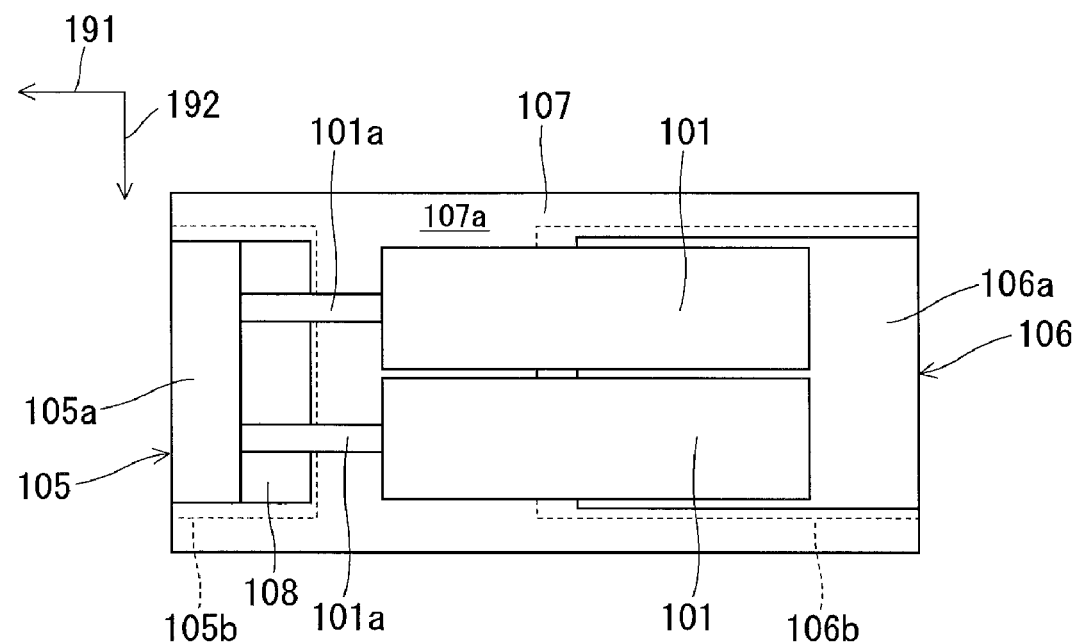
FIG. 18 is a cross-sectional view showing a further conventional solid electrolytic capacitor.

Compared to the conventional solid electrolytic capacitor in which the first anode section 105a and the first cathode section 106a are arranged so as to be spaced from each other in the length direction 191 and the capacitor element 101 is mounted with the anode section 101a thereof being oriented in the length direction 191 as shown in FIG. 17, in the solid electrolytic capacitor according to this embodiment, the length of the first anode section 31 can be increased in a direction generally perpendicular to a direction in which the anode section 1a of the mounted capacitor element 1 is to be oriented, even if the capacitor has the same size of the contour as that of the conventional solid electrolytic capacitor. In other words, it is possible to increase the length of the first anode section 31 for a direction in which the plurality of capacitor elements 1 are aligned.

Therefore, it is possible to mount on the insulating substrate 5 more capacitor elements 1 than in the conventional solid electrolytic capacitor without decreasing the width of the capacitor element 1.

Figure 10:
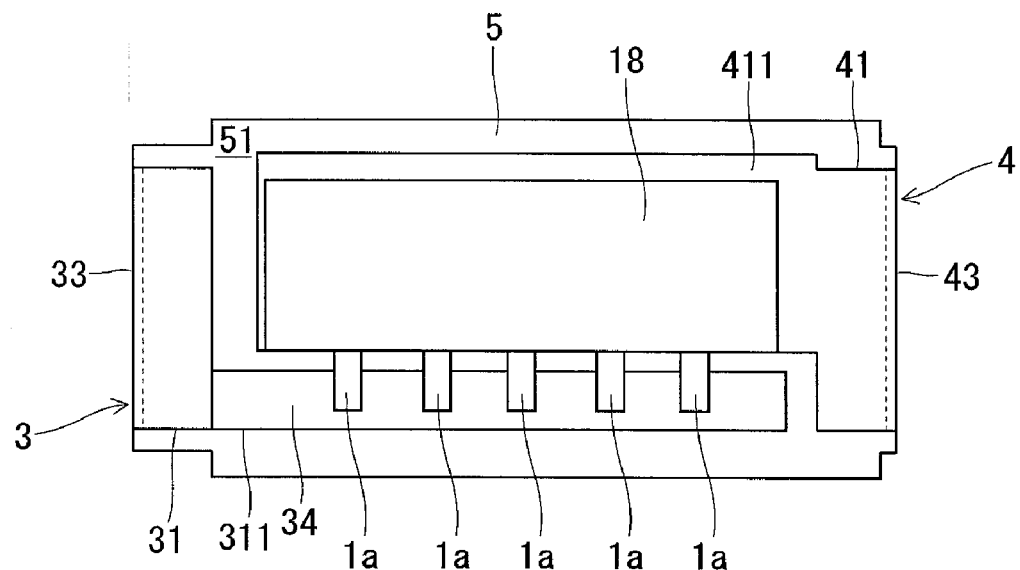
FIG. 10 is a top view showing an example of modification of the solid electrolytic capacitor without showing an enclosure resin thereof.

As shown in FIG. 10, it is also possible to mount on the insulating substrate 5 only one capacitor element 18 in which a plurality of anode sections 1a are aligned in the lateral direction (a direction generally perpendicular to a direction in which the anode section of the capacitor element is to be oriented), instead of mounting the plurality of capacitor elements 1 on the insulating substrate 5. According to this configuration, it is possible to increase the number of anode sections 1a to be connected to the first anode section 31 of the anode terminal 3 without changing the size of the contour of the solid electrolytic capacitor from that of the conventional solid electrolytic capacitor.

Therefore, with the solid electrolytic capacitor described above, it is possible to increase total connection area between the anode sections 1a of the capacitor element(s) 1 and the first anode section 31 of the anode terminal 3 without changing the size of the contour of the solid electrolytic capacitor from that of the conventional solid electrolytic capacitor, resulting in reducing the ESR or ESL of the solid electrolytic capacitor.

Further, in the solid electrolytic capacitor described above, it is possible to mount the capacitor element 1 having a small aspect ratio, and therefore, a crack is not generated easily in the anode body 11 of the capacitor element 1. Therefore, the yield is improved and production cost can be reduced.

Furthermore, in the solid electrolytic capacitor described above, it is possible to mount the capacitor element having a width (a measure in a direction generally perpendicular to a direction in which the anode section of the capacitor element is to be oriented) equivalent to or greater than that of the capacitor element mounted in the conventional solid electrolytic capacitor, and therefore, it is easy to mount the capacitor element on the insulating substrate 5.

In the solid electrolytic capacitor described above, since the anode conductive layer 33 and the cathode conductive layer 43 are formed on the side edge surfaces of the insulating substrate 5, it is not necessary to execute in the manufacturing process a complicated step required in the manufacturing process of the conventional solid electrolytic capacitor, namely a step of filling the vias 105c, 106c formed in the insulating substrate 5 with a resin material 109 as shown in FIG. 17. Therefore, the solid electrolytic capacitor according to this embodiment can be manufactured easily.

Further, in the solid electrolytic capacitor described above, since the connection part 34 is formed integrally with the first anode section 31 of the anode terminal 3, it is not necessary to execute a complicated step required in the manufacturing process of the conventional solid electrolytic capacitor in which the connection part 34 and the first anode section 31 are formed as separate members (cf. FIG. 17), namely a complicated step of installing the pad member 108 on the first anode section 105a before mounting the capacitor element 1 on the insulating substrate 5.

In the case of mounting the solid electrolytic capacitor described above on a wiring board, the lower surface electrodes including the second anode section 32 and the second cathode section 42 are soldered on a land on the wiring board.

In the solid electrolytic capacitor described above, the anode conductive layer 33 and the cathode conductive layer 43 are connected respectively to the second anode section 32 and the second cathode section 42 which are to be the lower surface electrodes, and are exposed from the side surfaces of the enclosure resin 2 as described above. Therefore, solder wettability of the lower surface electrodes improves. In other words, when the lower surface electrodes are soldered on the land on the wiring board, a part of solder can be easily provided around side edge surfaces of the lower surface electrodes. Therefore, a fillet is easily generated on the side edge surfaces of the lower surface electrodes, and as a result, the connection condition between the lower surface electrodes and the land on the wiring board is good.

In the solid electrolytic capacitor described above, since the connection part 34 is formed integrally with the first anode section 31 of the anode terminal 3 as discussed above, the connection condition between the connection part 34 and the first anode section 31 is better than in the conventional solid electrolytic capacitor (cf. FIG. 17) in which the connection part 34 and the first anode section 31 are formed as separate members, and the ESR or ESL of the solid electrolytic capacitor is reduced.

Further, in the solid electrolytic capacitor described above, the distance L1 between the anode extension part 311 and the cathode extension part 411 in the width direction 92 is smaller than the distance L2 between the second anode section 32 and the second cathode section 42 for the length direction 91. Therefore, the area of the cathode extension part 411 of the first cathode section 41 can be increased, and therefore, a connection area between the first cathode section 41 and the cathode section 1b of the capacitor element 1 can be increased, and as a result, the ESR or ESL of the solid electrolytic capacitor is reduced.

Furthermore, in the solid electrolytic capacitor described above, each of the capacitor elements 1 is arranged so that the end of the cathode section 1b of the capacitor element 1 and the end of the cathode extension part 411 of the first cathode section 41, which are both located on the first anode section 31 side, are generally flush with each other at a position spaced from the first anode section 31 by the predetermined distance L1 in the width direction 92. Therefore, a path of an electric current flowing in the solid electrolytic capacitor is short, resulting in reducing the ESL of the solid electrolytic capacitor.

Figure 11:
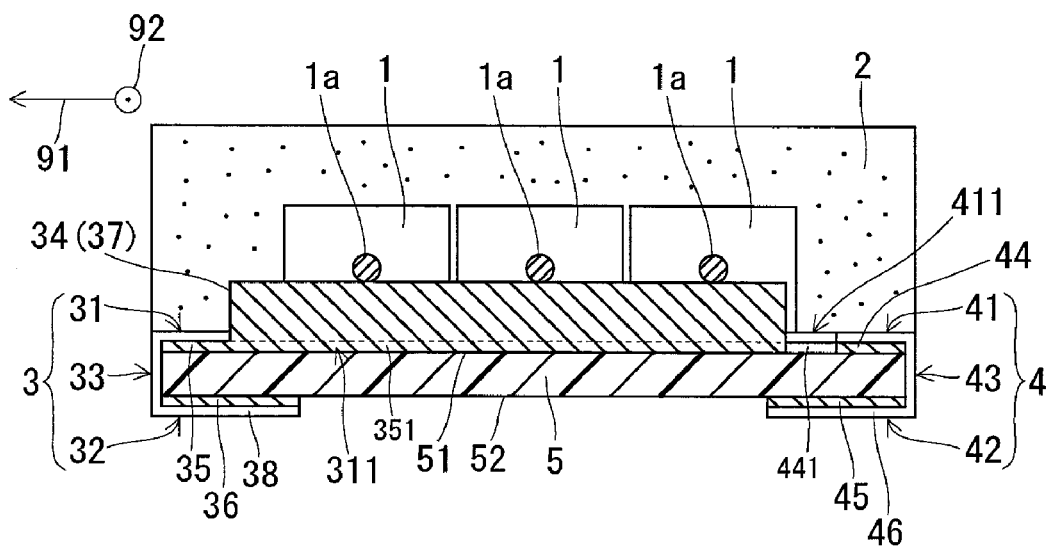
FIG. 11 is a cross-sectional view showing another example of modification of the solid electrolytic capacitor.

FIG. 11 is a cross-sectional view showing another example of modification of the solid electrolytic capacitor described above. As shown in FIG. 11, the plating layer 38 may be formed only on the outer peripheral surface of the first anode forming part 35, the outer peripheral surface of the second anode forming part 36, and the part of the side edge surface of the insulating substrate 5, without forming the plating layer 38 on the outer peripheral surface of the connection forming part 37. In the solid electrolytic capacitor according to this modification, the connection part 34 is formed by the connection forming part 37 which is not provided with the plating layer 38 on the outer peripheral surface thereof.

Therefore, in the solid electrolytic capacitor according to the modification described above, the connection condition between the connection part 34 and the anode section 1a by welding is not affected by the formation condition of the plating layer 38.

Figure 12:
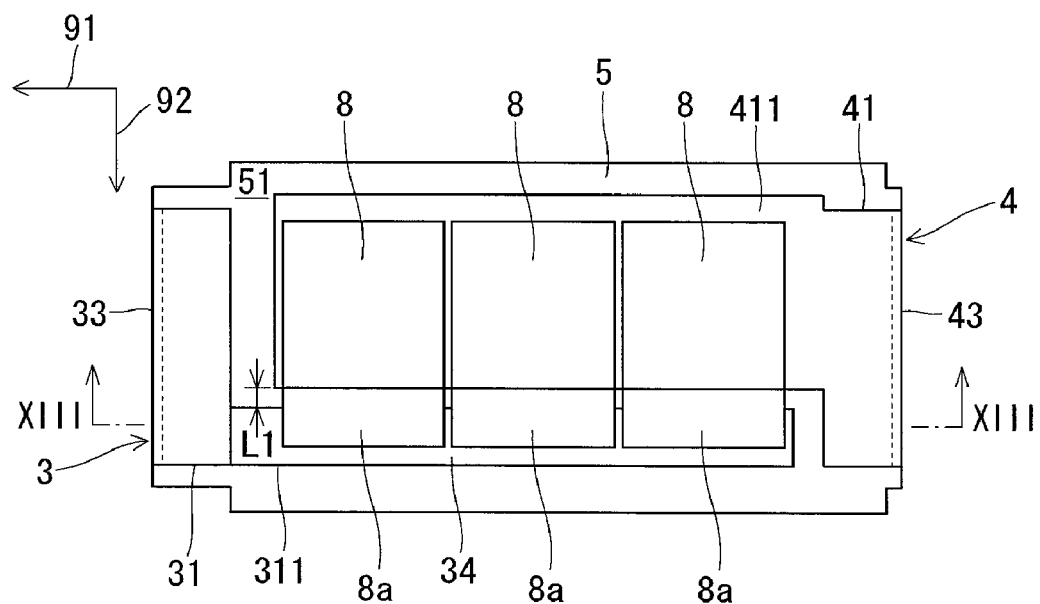
FIG. 12 is a top view showing a further example of modification of the solid electrolytic capacitor without showing an enclosure resin thereof.
Figure 13:
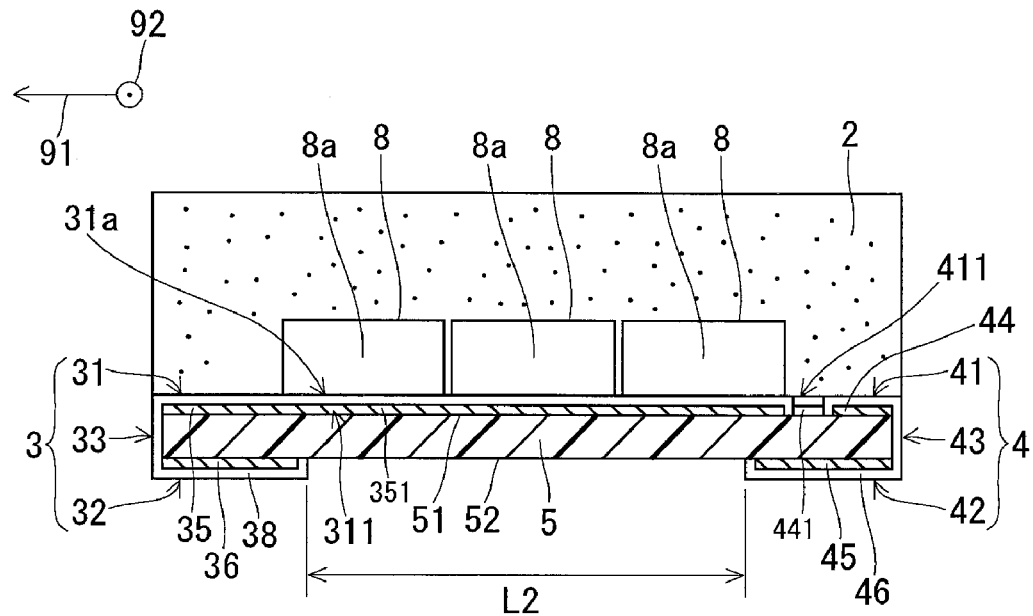
FIG. 13 is a cross-sectional view of the solid electrolytic capacitor cut along a XIII-XIII line of the FIG. 12.

FIGS. 12 and 13 are a top view and a cross-sectional view, respectively, of a further example of modification of the solid electrolytic capacitor described above. As shown in FIGS. 12 and 13, on the insulating substrate 5, capacitor elements 8 each including a foil-like anode body 81 may be mounted instead of the capacitor elements 1 described above.

Figure 14:
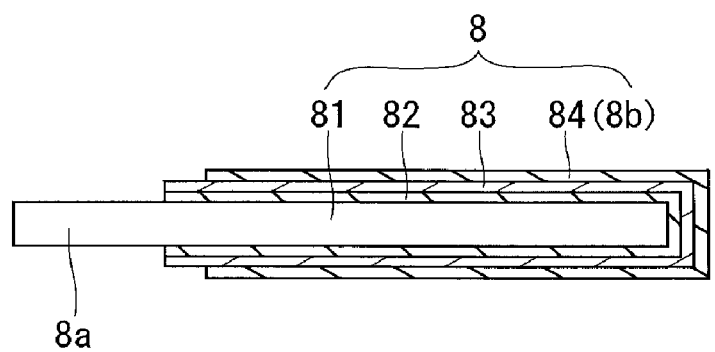
FIG. 14 is a cross-sectional view of a capacitor element included in the solid electrolytic capacitor shown in FIG. 12.

Specifically, as shown in FIG. 14, the capacitor element 8 comprises the anode body 81, a dielectric layer 82 formed on a part of an outer peripheral surface of the anode body 81, an electrolyte layer 83 formed on the dielectric layer 82, and a cathode layer 84 formed on the electrolyte layer 83.

For the anode body 81, used is a foil body made of a valve metal, on the surface of which a porous layer is formed by etching. As the valve metal, used is, for example, Aluminum, tantalum, niobium, titanium or the like.

The dielectric layer 82 is formed by an oxide film formed on the part of the outer peripheral surface of the anode body 81, and the oxide film is formed by immersing a part of the anode body 81 in the electrolyte solution such as phosphate aqueous solution, adipic acid aqueous solution or the like, to oxidize an outer peripheral surface of the part of the anode body 81 electrochemically (anodic oxidation).

The electrolyte layer 83 is formed of an electrically-conductive inorganic material such as manganese dioxide or the like, an electrically-conductive organic material such as TCNQ (Tetracyano-quinodimethane) complex salt, conductive polymer or the like, and formed on the dielectric layer 82.

The cathode layer 84 is formed by a carbon layer formed on the electrolyte layer 83 and a silver paste layer formed on the carbon layer, and the electrolyte layer 83 and the cathode layer 84 are electrically connected to each other.

In the capacitor element 8 described above, an anode section 8a of the capacitor element 8 is formed by an exposed portion of the outer peripheral surface of the anode body 81 which is not covered by the dielectric layer 82, and a cathode section 8b of the capacitor element 8 is formed by the cathode layer 84.

In the solid electrolytic capacitor according to the modification described above, the anode section 8a of the capacitor element 8 is electrically connected by welding to a partial area 31a of the upper surface of the first anode section 31, namely an upper surface of the anode extension part 311. Therefore, the partial area 31a of the upper surface of the first anode section 31 forms a connection part for electrically connecting the first anode section 31 and the anode section 8a of the capacitor element 8 to each other. The connection part is formed integrally with the first anode section 31.

The cathode section 8b of the capacitor element 8 is electrically connected to the cathode extension part 411 of the first cathode section 41 by the conductive adhesive in a similar manner to the solid electrolytic capacitor shown in FIGS. 1 and 2.

Also in the solid electrolytic capacitor according to the modification described above, it is possible to increase total connection area between the anode sections 8a of the capacitor elements 8 and the first anode section 31 of the anode terminal 3 without changing the size of the contour of the solid electrolytic capacitor in a similar manner to the solid electrolytic capacitor shown in FIG. 1, resulting in reducing the ESR or ESL of the solid electrolytic capacitor. Also, in the solid electrolytic capacitor according to the modification described above, the yield is improved and production cost can be reduced, and also, the capacitor can be manufactured easily.

Figure 15:
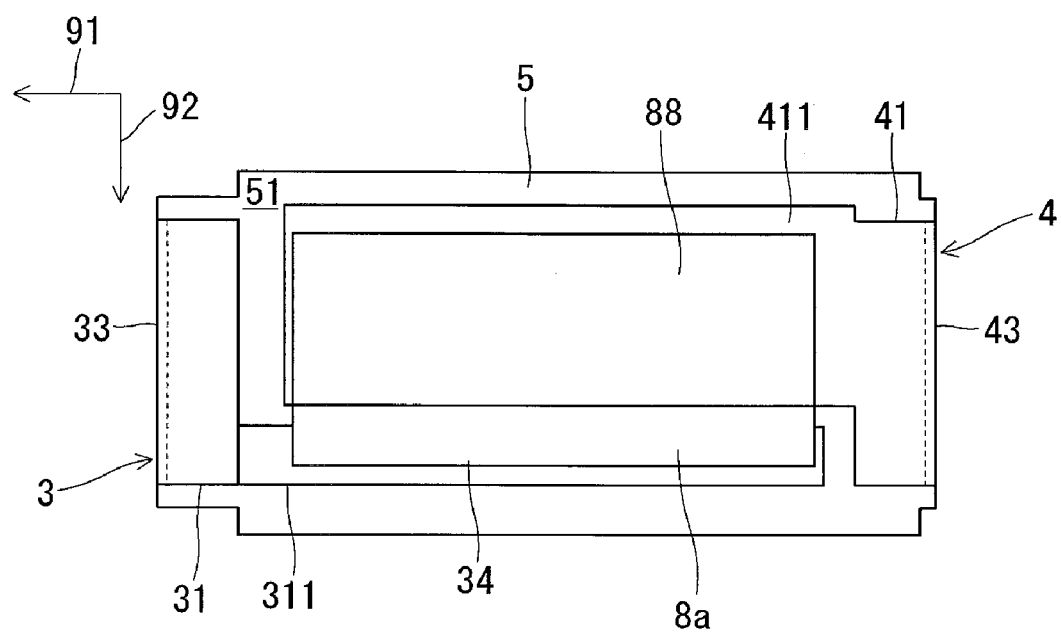
FIG. 15 is a top view showing the solid electrolytic capacitor shown in FIG. 12 without showing an enclosure resin thereof.
Figure 16:
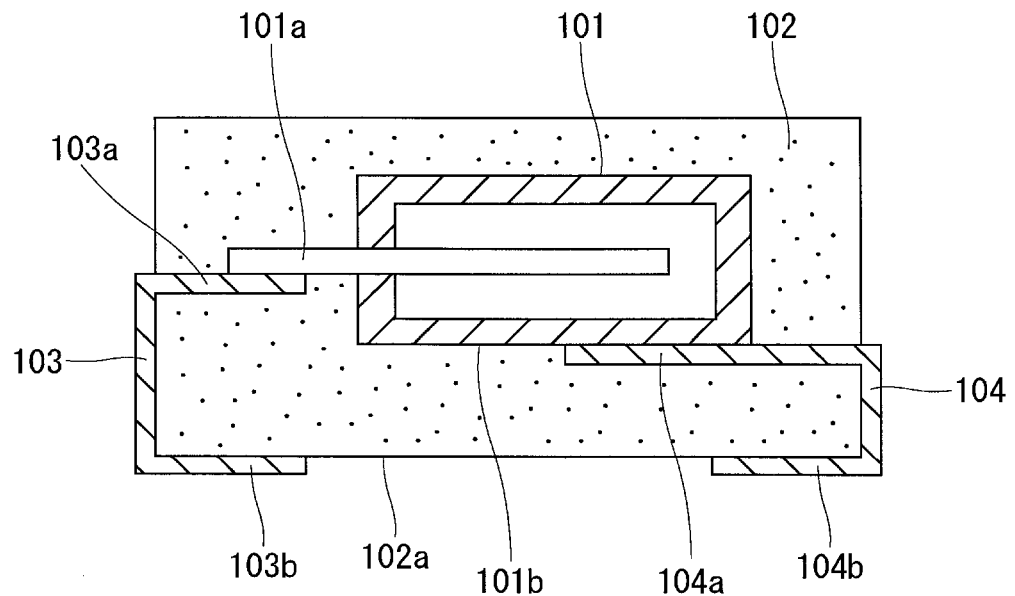
FIG. 16 is a cross-sectional view showing a conventional solid electrolytic capacitor.

It is also possible to mount on the insulating substrate 5 only one capacitor element 88 having a greater width than that of the capacitor element 8 as shown in FIG. 15, instead of mounting the plurality of capacitor elements 8 on the insulating substrate 5. According to this configuration, it is possible to further increase total connection area between the anode section 8a of the capacitor element 88 and the first anode section 31 of the anode terminal 3 without changing the size of the contour of the solid electrolytic capacitor, resulting in further reducing the ESR or ESL of the solid electrolytic capacitor.

The present invention is not limited to the foregoing embodiment in construction but can be modified variously within the technical range set forth in the appended claims. For example, the shapes of the first anode section 31 and the first cathode section 41 are not limited to those in the embodiment described above (FIG. 1), and various shapes thereof may be employed. However, the first anode section 31 and the first cathode section 41 need to be formed so as to be spaced from each other in the width direction 92.

In the embodiment described above, copper is used as the material of the first and second anode forming parts 35, 36 which form the anode terminal 3, and the material of the first and second cathode forming parts 44, 45 which form the cathode terminal 4. However, this invention is not limited to this, and various electrically conductive materials can be used as the materials.

Further, the capacitor element which can be mounted on the insulating substrate 5 is not limited to the four types of capacitor elements 1, 18, 8, and 88 described above, and various types of capacitor element may be employed, for example, a capacitor element including the anode lead 12 drawn out from both ends of the anode body 11, or the like.

Furthermore, in the above described embodiment, the one copper sheet 62 is etched to form the second anode forming part 36 forming the second anode section 32 and the second cathode forming part 45 forming the second cathode section 42 in the second step of the electrode forming step (cf. FIGS. 4b and 5b), but the present invention is not limited to this. For example, it is also possible to prepare a copper sheet which is to be the second anode forming part 36 and a copper sheet which is to be the second cathode forming part 45 separately, and bond them at the positions spaced from each other by the distance (L2+α).

What is claimed is:
1. A solid electrolytic capacitor comprising:
   a capacitor element including an anode section, a cathode section, and a dielectric layer; and an insulating substrate in which an anode terminal and a cathode terminal are formed, the capacitor element being mounted on the insulating substrate, wherein a first anode section and a first cathode section are formed on a first surface of the insulating substrate on which the capacitor element is mounted, so as to be spaced from each other in a first predetermined direction, a second anode section and a second cathode section are formed on a second surface of the insulating substrate which is on an opposite side to the first surface, so as to be spaced from each other in a second direction generally perpendicular to the first direction, the anode terminal comprises the first anode section and the second anode section, which are electrically connected to each other, the cathode terminal comprises the first cathode section and the second cathode section, which are electrically connected to each other, the capacitor element is arranged on the first surface of the insulating substrate with the anode section thereof being oriented in the first direction, and the anode section and the cathode section of the capacitor element are electrically connected to the first anode section and the first cathode section, respectively.

2. The solid electrolytic capacitor according to claim 1, wherein the first anode section and the first cathode section extend long in the second direction.

3. The solid electrolytic capacitor according to claim 2, wherein a plurality of capacitor elements are mounted on the first surface of the insulating substrate, and the plurality of capacitor elements are aligned in the second direction.

4. The solid electrolytic capacitor according to claim 1, wherein a connection part configured to electrically connect the first anode section and the anode section of the capacitor element to each other is formed integrally with the first anode section.

5. The solid electrolytic capacitor according to claim 1, wherein a distance between the first anode section and the first cathode section with respect to the first direction is smaller than a distance between the second anode section and the second cathode section with respect to the second direction.

6. The solid electrolytic capacitor according to claim 1, wherein an end of the cathode section of the capacitor element and an end of the first cathode section of the cathode terminal, which are located on the first anode section side, are generally flush with each other at a position spaced from the first anode section by a predetermined distance in the first direction.

7. The solid electrolytic capacitor according to claim 1, wherein the capacitor element includes an anode body from which an anode lead is drawn out, the dielectric layer is formed on an outer peripheral surface of the anode body, a cathode layer is formed on an electrolyte layer which is formed on the dielectric layer, and the anode lead and the cathode layer form the anode section and the cathode section of the capacitor element, respectively.

8. The solid electrolytic capacitor according to claim 1, wherein the capacitor element includes a foil-like anode body, the dielectric layer is formed on a part of an outer peripheral surface of the anode body, a cathode layer is formed on an electrolyte layer which is formed on the dielectric layer, and a part of the outer peripheral surface of the anode body which is exposed from the dielectric layer and the cathode layer form the anode section and the cathode section of the capacitor element, respectively.

\* \* \* \* \*